US009727368B1

(12) United States Patent
Tsirkin et al.

(10) Patent No.: US 9,727,368 B1
(45) Date of Patent: Aug. 8, 2017

(54) VIRTUAL MACHINE MIGRATION ACCELERATION WITH PAGE STATE INDICATORS

(71) Applicant: Red Hat Israel, Ltd., Raanana (IL)

(72) Inventors: Michael Tsirkin, Raanana (IL); David Alan Gilbert, Manchester (GB)

(73) Assignee: Red Hat Israel, Ra'Anana (IL)

( * ) Notice: Subject to any disclaimer, the term of this patent is extended or adjusted under 35 U.S.C. 154(b) by 0 days.

(21) Appl. No.: 15/238,132

(22) Filed: Aug. 16, 2016

(51) Int. Cl.
*G06F 9/46* (2006.01)
*G06F 9/455* (2006.01)
*G06F 3/06* (2006.01)

(52) U.S. Cl.
CPC .......... *G06F 9/45558* (2013.01); *G06F 3/061* (2013.01); *G06F 3/064* (2013.01); *G06F 3/067* (2013.01); *G06F 3/0647* (2013.01); *G06F 3/0664* (2013.01); *G06F 9/45545* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| 3,858,182 | A | * | 12/1974 | Delagi | ........ | G06F 9/462 726/16 |
|---|---|---|---|---|---|---|
| 6,802,062 | B1 | | 10/2004 | Oyamada et al. | | |
| 6,804,729 | B2 | | 10/2004 | Swanberg | | |
| 7,962,703 | B1 | | 6/2011 | Shah et al. | | |
| 8,356,149 | B2 | * | 1/2013 | Young | ........ | G06F 9/5016 711/162 |
| 8,386,731 | B2 | | 2/2013 | Mashtizadeh et al. | | |

(Continued)

OTHER PUBLICATIONS

Brendan Cully, "Generalized High Availability via Virtual Machine Replication" http://citeseerx.ist.psu.edu/viewdoc/download?doi=10.1.1.186.4141&rep=rep1&type=pdf, The University of British Columbia, Oct. 2007, 61 pages.

(Continued)

*Primary Examiner* — Wissam Rashid
(74) *Attorney, Agent, or Firm* — Haynes and Boone, LLP (57) ABSTRACT

Methods, systems, and computer program products are included for migrating a virtual machine. An example method of migrating a virtual machine includes providing a virtual machine by a source hypervisor. The source hypervisor initiates the running of a guest on the virtual machine. The source hypervisor sends the guest a migration indicator that corresponds to a migration of the virtual machine. The virtual machine is then placed in a suspended state. The source hypervisor receives a free memory page indicator from the guest that identifies one or more free memory pages. While the virtual machine is in the suspended state, the source hypervisor modifies a migration status of the identified one or more free memory pages to indicate that the identified one or more free memory pages are not to be migrated. After resuming operation of the virtual machine from the suspended state, the source hypervisor detects a dirty memory page indicator that identifies one or more dirty memory pages. The source hypervisor then modifies a migration status of the one or more dirty memory pages to indicate that the one or more dirty memory pages are to be migrated.

20 Claims, 4 Drawing Sheets

(56) References Cited

U.S. PATENT DOCUMENTS

| | | |
|---|---|---|
| 8,656,388 B2 | 2/2014 | Chou et al. |
| 8,667,490 B1 | 3/2014 | Van der Goot |
| 9,032,398 B2 | 5/2015 | Ahmad et al. |
| 9,197,489 B1 | 11/2015 | Vincent |
| 2009/0063749 A1* | 3/2009 | Dow ................. G06F 12/08 711/6 |
| 2013/0254321 A1 | 9/2013 | Johnsen et al. |
| 2015/0095576 A1 | 4/2015 | Subrahmanyam et al. |
| 2015/0149687 A1 | 5/2015 | Tsirkin et al. |

OTHER PUBLICATIONS

Brendan Cully et al., "Remus: High Availability via Asynchronous Virtual Machine Replication" https://www.usenix.org/legacy/event/nsdi08/tech/full_papers/cully/cully_html/, Department of Computer Science The University of British Columbia, accessed May 4, 2016, 23 pages.

Michael Tsirkin et al. "Virtual Machine Migration Using Free Page Hinting" U.S. Appl. No. 14/850,055, filed Sep. 10, 2015, 30 pages.

Michael Tsirkin et al. "Virtual Machine Migration Using Free Page Hinting" Office Action for U.S. Appl. No. 14/850,055 dated May 19, 2016, 12 pages.

* cited by examiner

VIRTUAL MACHINE MIGRATION ACCELERATION WITH PAGE STATE INDICATORS

FIELD OF DISCLOSURE

The present disclosure generally relates to electrical computers and digital data processing, and more particularly relates to virtual machine migration.

BACKGROUND

A virtual machine is software that is executed on hardware to create a virtualization of a physical computer system. Virtual machines may function as self-contained platforms that run their own operating systems and software applications. A host machine may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows guests of the virtual machines to transparently access the host machine's resources.

Guest applications, including guest operating systems, may be executed on the allocated resources of each virtual machine. Local or remote clients may access these guest applications to perform computing tasks. In some instances, virtual machines and guest applications may be implemented to provide cloud computing environments.

SUMMARY

A system of one or more computers can be configured to perform particular operations or actions by virtue of having software, firmware, hardware, or a combination thereof installed on the system that causes or cause the system to perform the actions. In some examples, a method of migrating virtual machine memory pages includes running a guest on a virtual machine that is provided by a source hypervisor. The method of migrating virtual machine memory pages also includes sending a migration indicator from the source hypervisor to the guest, the migration indicator corresponding to a migration of the virtual machine from the source hypervisor to a destination hypervisor. The method further includes receiving, by the source hypervisor, a free memory page indicator that is asynchronously sent from the guest to identify one or more free memory pages. After receiving the free memory page indicator from the guest, the source hypervisor places the virtual machine in a suspended state. The method of migrating virtual machine memory pages also includes modifying a migration status of the identified one or more free memory pages by the source hypervisor while the virtual machine is in the suspended state to exclude the identified one or more free memory pages from the migration. The method further includes detecting, by the source hypervisor, a dirty memory page indicator that identifies one or more dirty memory pages. The method of migrating virtual machine memory pages also includes modifying, by the source hypervisor, a migration status of the identified one or more dirty memory pages to include the identified one or more dirty pages in the migration. Other examples include corresponding computer systems, apparatus, and computer programs recorded on one or more computer storage devices, each configured to perform the actions of the methods.

In some examples, a non-transitory machine-readable medium includes machine-readable instructions having stored thereon that are executable to cause a machine to perform operations including running a guest on a virtual machine that is provided by a source hypervisor. The machine-readable instructions are further executable for sending a migration indicator from the source hypervisor to the guest, the migration indicator corresponding to a migration of the virtual machine from the source hypervisor to a destination hypervisor; receiving, by the source hypervisor, a free memory page indicator from the guest that identifies one or more free memory pages; after receiving the free memory page indicator from the guest, placing the virtual machine in a suspended state. The non-transitory machine-readable medium also includes machine-readable instructions for modifying a migration status of the identified one or more free memory pages by the source hypervisor to exclude the identified one or more free memory pages from the migration; detecting, by the source hypervisor, a dirty memory page indicator that identifies one or more dirty memory pages. The non-transitory machine-readable medium also includes machine-readable instructions for modifying, by the source hypervisor, a migration status of the identified one or more dirty memory pages to include the identified one or more dirty pages in the migration.

In some examples, a system includes one or more hardware processors coupled to a memory that read instructions from the memory to cause the system to perform operations including running a guest on a virtual machine that is provided by a source hypervisor. The system performs operations for sending a migration indicator from the source hypervisor to the guest; receiving a free memory page indicator from the guest that identifies one or more free memory pages; placing the virtual machine in a suspended state after receiving the free memory page indicator from the guest; and modifying a migration status of the identified one or more free memory pages by the source hypervisor to exclude the identified one or more free memory pages from the migration. The system further performs operations for detecting a dirty memory page indicator that identifies one or more dirty memory pages and modifying, by the source hypervisor, a migration status of the identified one or more dirty memory pages to include the identified one or more dirty pages in the migration.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for migrating a virtual machine running on a hypervisor of source host machine to another location in memory or over a network to a destination host machine. The migration of a virtual machine may be performed by copying and/or transmitting the memory pages of the guest memory that is allocated to the virtual machine. The migration of the memory pages of the virtual machine is improved by identifying free memory pages of the virtual machine and excluding these free memory pages from the migration.

For example, the hypervisor may notify a guest that is running on the virtual machine when a migration is initiated. The hypervisor may then delay the migration temporarily, so that the guest may respond to the notification by providing the hypervisor with a list of free memory pages. The hypervisor may then stop the virtual machine to provide the hypervisor with time to update a migration list that specifies memory pages to include in the migration. While the virtual machine is stopped, the hypervisor may remove the identified free memory pages that are identified from the migration list. Accordingly, the amount of pages migrated is reduced.

After updating the migration list, the hypervisor may then resume operations of the virtual machine so that the guests of the virtual machine may continue their operations. In the event that free memory pages are modified during the migration, the guest may notify the hypervisor that the memory pages are dirty so that the hypervisor can add the memory pages to the migration list. Similarly, the guest may notify the hypervisor when memory pages become free memory pages, so that the hypervisor can remove the memory pages from the migration list.

These techniques are beneficial and advantageous for reducing the amount of data that is accessed, stored, and/or transmitted to perform a migration of a virtual machine. Reducing the computing resources associated with these computing tasks allow for the migration to be performed faster and more efficiently. For example, large numbers of memory pages may be excluded from a migration, thus reducing processing, network, and memory resources that would be consumed by reading data from the memory pages, transmitting the data over a network, and/or storing the data at the destination. Of course, it is understood that these features and advantages are shared among the various examples herein and that no one feature or advantage is required for any particular example.

Figure 1:
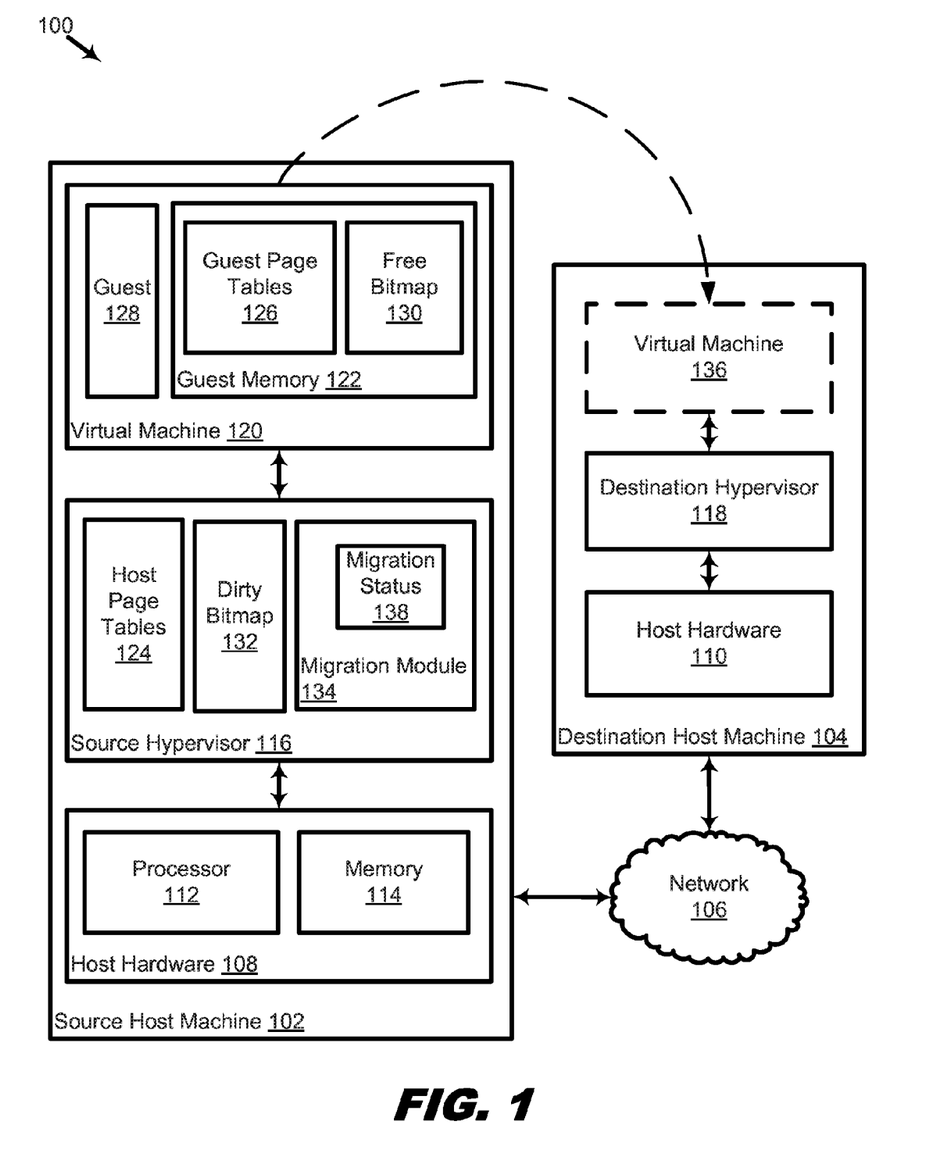
FIG. 1 is an organizational diagram illustrating a system for migrating a virtual machine from a source hypervisor to a destination hypervisor, in accordance with various examples of the present disclosure.

FIG. 1 is an organizational diagram illustrating a system 100 for migrating a virtual machine from a source hypervisor to a destination hypervisor, in accordance with various examples of the present disclosure.

The system 100 includes a source host machine 102. The source host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single source host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The system 100 includes a destination host machine 104, which may be structured similarly to the source host machine 102 described above. For example, the destination host machine 104 may include a personal computer (PC), tablet PC, rack mount computer, cellular telephone, web appliance, server, network router, switch or bridge, or any machine capable of executing a set of instructions (sequential or otherwise) that specify actions to be taken by that machine.

The source host machine 102 and the destination host machine 104 are communicatively coupled by a network 106 that communicates data between the source host machine 102 and the destination host machine 104. For example, the network 106 may transmit data corresponding to one or more virtual machines from the source host machine 102 to the destination host machine 104. The network 106 may include one or more public and/or private networks, which may each be comprised of network devices that transfer data via wired and/or wireless transmission media.

The source host machine 102 is structured with host hardware 108. The host hardware 108 includes physical elements such as a processor 112 and a memory 114. In some examples more than one of each of these hardware elements may be included. For example, the host hardware 108 may include a plurality of processors coupled to various types of memory and host devices. The destination host machine 104 similarly is structured with host hardware 110, which may include similar components to those described with respect to the host hardware 108 of the source host machine 102. For example, the host hardware 110 may include one or more processors coupled to one or more memory devices.

The processor 112 included in the host hardware 108 is structured to include one or more general-purpose processing devices such as a microprocessor, central processing unit, and the like. More particularly, the processor 112 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 112 is structured to include one or more special-purpose processing devices such as an application specific integrated circuit (ASIC), a field programmable gate array (FPGA), a digital signal processor (DSP), network processor, and so forth. The processor 112 executes instructions for performing the operations, steps, and actions discussed herein.

The memory 114 included in the host hardware 108 is structured to include at least one computer-readable storage medium on which is stored one or more sets of instructions (e.g., software) embodying any one or more of the methodologies or functions described herein. The memory 114 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 112.

The processor 112 and memory 114 may be communicatively coupled via one or more buses (e.g., a PCI bus) and/or integrated into a motherboard of the source host machine 102. The host hardware 108 also may include other hardware elements, such as a video display unit (e.g., a liquid crystal display (LCD) monitor), alphanumeric input device (e.g., a keyboard), cursor control device (e.g., a mouse), signal generation device (e.g., a speaker), a network interface card, wireless adapter card, audio/sound card, graphics card, storage adapter, and/or other hardware device.

The source host machine 102 is structured to include a source hypervisor 116, which may include a virtual machine monitor and/or virtual machine manager. The source hypervisor 116 is structured with executable instructions that are stored in the memory 114 and executed by the processor 112 to provide one or more virtual machines. In some examples, the source hypervisor 116 is structured to run on top of an operating system and/or kernel. In other examples, the source hypervisor 116 is run directly on host hardware 108 without the use of a separate operating system or kernel.

The destination host machine 104 similarly is structured with a destination hypervisor 118, which may include similar components to those described with respect to the source hypervisor 116 of the source host machine 102. For example, the destination hypervisor 118 is structured with executable instructions that are stored and executed using the host hardware 110 to provide one or more virtual machines on the destination host machine 104. The destination hypervisor 118 may also run on top of an operating system and/or kernel, or run directly on the host hardware 110 without the use of a separate operating system or kernel.

The system 100 includes a virtual machine 120 that is provided by the source hypervisor 116. The source hypervisor 116 is structured to provide the virtual machine 120 by virtualizing at least a portion of the host hardware 108. The source hypervisor 116 may provide the virtual machine 120 by performing a hardware emulation, full virtualization, para-virtualization, and/or operating system-level virtualization corresponding to the source host machine 102. The source hypervisor 116 manages system resources, including providing access of guests (e.g., guest applications such as operating systems, kernels, user applications, and so forth) of the virtual machine 120 to the host hardware 108, such as the processor 112 and the memory 114.

Although one virtual machine is illustrated as running on source host machine 102, the source hypervisor 116 may provide a plurality of virtual machines. Other virtual machines may include components similar to those illustrated with respect to virtual machine 120, such as a guest, guest memory, guest page tables, and so forth.

The virtual machine 120 is structured with a guest memory 122. The guest memory 122 is a memory resource that is provided by the source hypervisor 116. The source hypervisor 116 is structured to provide the guest memory 122 by allocating a portion of the memory 114 using the host page tables 124. The memory 114 is divided into host-physical memory addresses that are portioned into fixed-length blocks of memory that compose memory pages. The host page tables 124 provide entries corresponding to the memory pages that are included in one or more tables. The host page tables 124 use the entries to map one or more ranges of the host-physical memory addresses into one or more guest-physical address ranges that are assigned to the virtual machine 120 as the guest memory 122.

The guest memory 122 is structured with guest page tables 126 that provide another layer of memory addresses mappings. The guest page tables 126 map one or more ranges of guest-virtual memory addresses to the guest-physical addresses provided by the host page tables 124. Accordingly, the guest-virtual memory addresses are mapped to guest-physical memory addresses by the guest page tables 126, and the guest-physical memory addresses are mapped to the host-physical memory addresses by the host page tables 124. Thus, memory pages in the guest memory may include one or more guest-virtual memory addresses that map to host-physical memory addresses by way of the guest page tables 126 and the host page tables 124.

The virtual machine 120 includes at least one guest 128, which may include a kernel, operating system (OS), and/or other application running on the virtual machine 120. A guest kernel of the virtual machine 120 may provide core computing functionality, such as allocating memory pages of the guest memory 122 to processes and/or threads, communicating input and/or output (I/O) to and from virtual devices, managing a file system, handling interrupts, scheduling and running processes to execute instructions of computing tasks by a virtual processor, providing an interface between devices and software applications, and/or providing other important computing features. A guest operating system of the virtual machine 120 may run on top of the kernel to provide additional interfaces and functionality on the virtual machine 120 beyond those offered by the kernel. The guest operating system may include, for example, RED HAT ENTERPRISE LINUX, FEDORA, WINDOWS, OS X, IOS, ANDROID, or any other operating system. In some examples, the virtual machine 120 may be structured to include a plurality of guest operating systems.

The guest 128 (e.g., a guest kernel, guest operating system, and/or other application) running on the virtual machine may access the guest-virtual memory addresses provided by the guest memory 122 to read, write, and/or execute data. The guest page tables 126 and the host page tables 124 translate the guest-virtual memory addresses to host-physical memory addresses using their page table mappings. Accordingly, the guest 128 is provided read, write, and/or execute access to data stored in the memory 114.

Memory pages may be classified as dirty pages or free pages based on their current usage or non-usage status. Dirty pages include memory pages that have been allocated to one or more guests of the virtual machine and modified to store data. For example, memory pages may be allocated to store executable instructions that are executed by a process running on the virtual machine. In another example, memory pages may be allocated to store other types of data for guests of the virtual machine, such as media files, databases, program files, and/or any other type of data. These memory pages that are allocated and modified for storing data are classified as dirty memory pages.

Free memory pages are memory pages that are not in-use and/or are available for allocation by the virtual machine. Free memory pages may include pages that have not been previously allocated as well as memory pages that have been previously allocated but have since been deallocated and/or freed. Memory pages may be freed when the data stored on the memory pages is no longer used and the memory pages are therefore no longer active. Accordingly, free memory pages may be inactive memory pages, clean memory pages, and other memory pages that are not currently in use on the virtual machine.

The guest memory 122 is structured with a free bitmap 130 that maintains status indicators corresponding to the memory pages in the guest memory 122. The free bitmap 130 is structured to store a plurality of bits, where each bit has a zero or a one value corresponding to a memory page in guest memory 122. Each bit indicates whether the memory page corresponding to the bit is in-use or free. The guest 128 may update the free bitmap 130 to track an up-to-date status of each memory page. Accordingly, the free bitmap 130 may be updated as memory pages are allocated and modified to indicate that the memory pages are in-use. Similarly, as memory pages are deallocated the guest 128 may update the free bitmap 130 to indicate that the memory pages are free memory pages that are available for allocation. Although the free bitmap 130 is illustrated as being located in guest memory 122, in other examples the free bitmap 130 may reside outside of the guest memory 122 in any memory region that is accessible by the source hypervisor 116.

The source hypervisor 116 is structured to include a dirty bitmap 132 that maintains status indicators corresponding to memory pages. The dirty bitmap 132 stores a plurality of bits, where each bit has a zero or a one value corresponding to a memory page in a guest memory 122. The dirty bitmap 132 includes dirty bits that indicate whether a memory page has been modified by a guest. A first bit value (e.g., 1) may indicate that a memory page has been modified, while a second bit value (e.g., 0), may indicate that the memory page has not been modified. The source hypervisor 116 is structured to update the dirty bitmap 132 to maintain an up-to-date status of each memory page. In some examples, the source hypervisor 116 marks the pages in the guest memory 122 as read-only during the initialization of the virtual machine. When a guest writes to a memory page in the guest memory 122, the memory access is trapped into the source hypervisor 116. Based on this trap, the source hypervisor 116 may set a bit corresponding to the memory page to indicate that the memory page is dirty. In other examples, dirty bits are stored in the host page tables 124 and the source hypervisor 116 traverses page table entries to fetch the dirty bits and write the dirty bits to the dirty bitmap 132. In yet other examples, the processor 112 signals to the source hypervisor 116 which memory pages have been modified using interrupts or other signaling mechanisms so that the source hypervisor 116 can update the dirty bitmap 132.

While the host page tables 124, guest page tables 126, free bitmap 130, and dirty bitmap 132 are described as including particular data structures (e.g., tables and bitmaps), in other examples other suitable data structures may be used instead of or in addition to tables or bitmaps. Moreover, while bits are described as being set or cleared to indicate the status of a memory page, any values (represented by one or more bits) may be used to indicate the status of the memory pages.

The system 100 is structure to include a migration module 134 that manages the transfer of virtual machines between host machines and/or between memory locations on a same host machine. For example, the migration module 134 may copy memory pages corresponding to the virtual machine 120 to another memory location in the memory 114. The migration module 134 may also migrate memory pages of the virtual machine 120 to the destination host machine 104. For example, the migration module 134 may read memory pages from the guest memory 122 and transmit the memory pages via the network 106 to the destination host machine 104. The destination hypervisor 118 may read the transmitted data and store the data in a guest memory on the destination host machine 104. The destination hypervisor 118 may then allocate the guest memory to a newly created virtual machine 136. Accordingly, a virtual machine 136 may be provided on the destination host machine 104 that is a replicate of the virtual machine 120.

The migration module 134 is structured to include a migration status 138 corresponding to the memory pages of the virtual machine 120. The migration status 138 may include a migration bitmap that includes one or more migrate status bits corresponding to the memory pages that indicate whether the memory pages are to be included in the migration. For example, a cleared migrate status bit (e.g., 0) may indicate that a memory page is to be excluded from the migration, while a set migrate status bit (e.g. 1) may indicate that the memory page is to be migrated. In other examples, the migration status may be maintained in a list, table, or other data structure. For example, the migration status 138 may include a list of memory pages that are to be migrated or a list of memory pages that are to be excluded from the migration. Accordingly, during the migration, the migration module 134 may iterate through the list of memory pages and migrate memory pages based on the migrate status bit corresponding to each of the memory pages.

Figure 2:
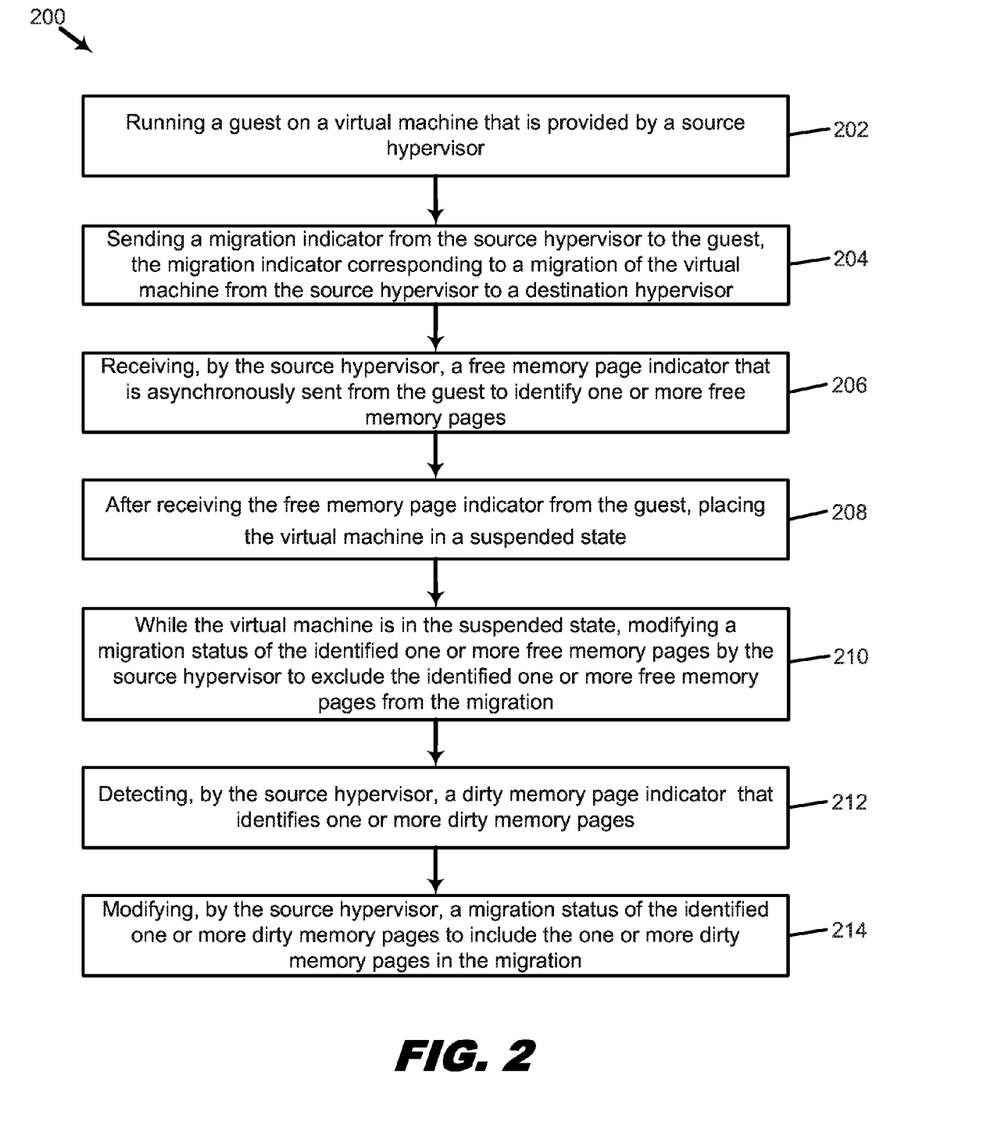
FIG. 2 is a flow diagram illustrating a method for migrating a virtual machine, in accordance with various examples of the present disclosure.
Figure 3:
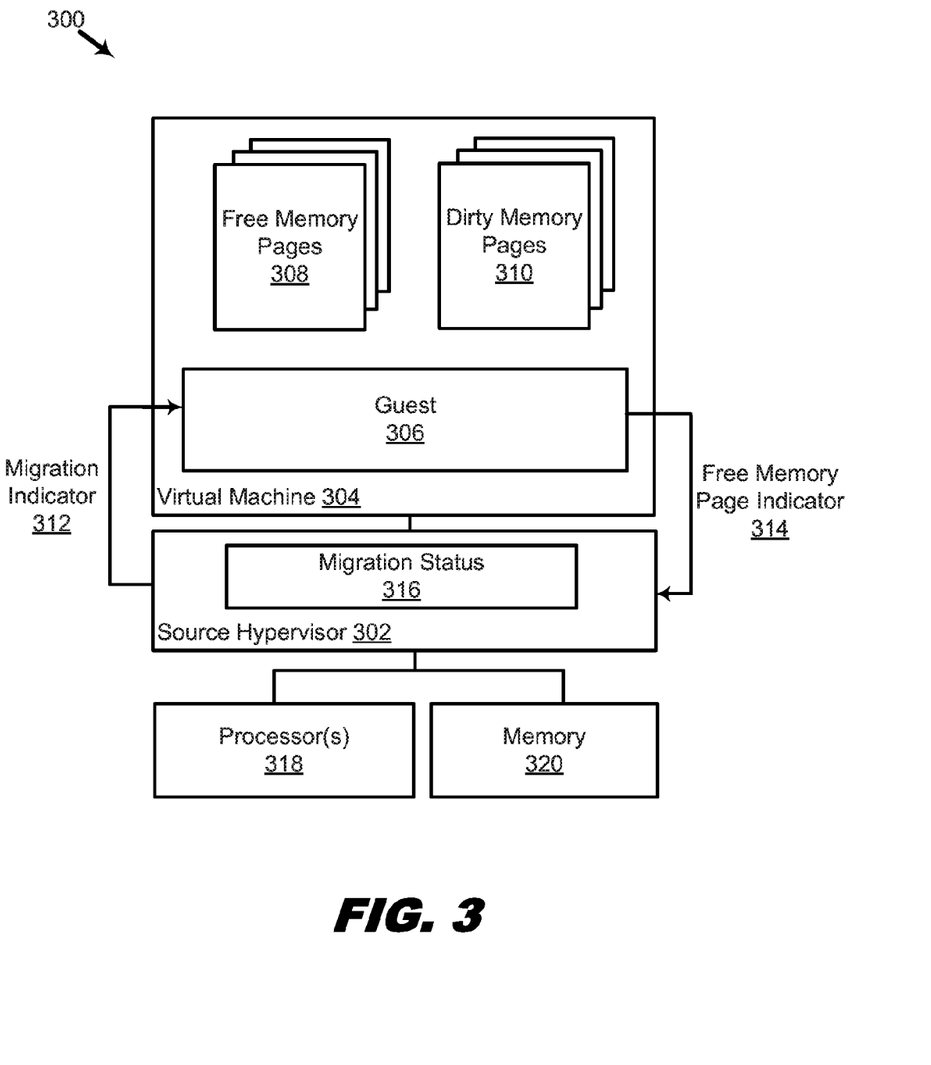
FIG. 3 is an organizational diagram illustrating a system for communicating migration indicators and memory page indicators between a hypervisor and a guest during a virtual machine migration, in accordance with various examples of the present disclosure.

FIG. 2 is a flow diagram illustrating a method 200 for migrating a virtual machine, in accordance with various examples of the present disclosure. FIG. 2 is described with reference to features and components illustrated in FIG. 3, which is an organizational diagram illustrating a system 300 for communicating migration indicators and memory page indicators between a hypervisor and a guest during a virtual machine migration, in accordance with various examples of the present disclosure. As illustrated in FIG. 3, a system includes one or more processors 318 and at least one memory 320. The method 200 may be performed by the one or more processors 318 executing computer-readable instructions that are stored on the memory 320.

At action 202, a source hypervisor (e.g., source hypervisor 302) provides a virtual machine (e.g., virtual machine 304). In some examples, the source hypervisor may provide a virtual machine by allocating computing resources to the virtual machine. Computing resources allocated to the virtual machine may include a portion of a host memory that is allocated to the virtual machine as a guest memory, processing resources, access to one or more host devices, and so forth. The hypervisor initiates a boot process on the virtual machine to run a guest (e.g., guest 306) on the virtual machine. The guest may include a guest kernel, guest operating system, or other application running on the virtual machine.

At action 204, the source hypervisor sends a migration indicator (e.g., migration indicator 312) to the guest corresponding to a migration of the virtual machine. The migration indicator may be triggered by a determination to perform a migration of the virtual machine from the source hypervisor to another portion of memory or to a destination host machine. In some examples, the migration includes reading data from memory pages of the virtual machine and transmitting the data from the memory pages to another machine over a network.

A virtual machine may be migrated for a variety of reasons. In some examples, a fault of the source hypervisor or the virtual machine may occur or be anticipated. Accordingly, the source hypervisor or a guest running on the virtual machine may trigger a migration of the virtual machine to another computing device as a failsafe mechanism. In this way, the virtual machine may remain active on another host machine despite the fault occurring on a first host machine. In other examples, a user may initiate the migration so that the host machine may be taken offline and/or serviced. For instance, the user may wish to reboot or replace a component of a host machine that is running the source hypervisor and the virtual machine. In yet other examples, a human administrator or software module may detect that the source host machine is resource constrained and initiate the migration to reduce the computing load on the source host machine. Accordingly, the administrator or the software module may initiate the migration of the virtual machine to a destination machine that has more computing resources available.

Responsive to the initiation of the migration, the migration indicator is sent to the guest running on the virtual machine to notify the guest that a migration has been initiated. The migration indicator may be an input from a user, a signal sent from the source hypervisor, or other communication that indicates to the virtual machine a status corresponding to a migration. The guest receives the migration indicator.

At action 206, after receiving the migration indicator, the guest identifies one or more free memory pages (e.g., free memory pages 308) in the guest memory that are allocated to the virtual machine. When the guest identifies one or more free memory pages, the guest sends a free memory page indicator (e.g., free memory page indicator 314) and/or a plurality of free memory page indicators to the source hypervisor that identifies the free memory pages. In some examples, the free memory page indicator identifies one or more ranges of free memory pages. In the present example, the source hypervisor may start migrating memory pages without waiting for the guest to provide the free memory page indicator. For example, the source hypervisor may start migrating memory pages immediately after sending the migration indicator to the guest. In other examples, the source hypervisor may delay for a preconfigured amount of time after sending the migration indicator, and then start migrating memory pages. Accordingly, the migration of memory pages by the source hypervisor may be performed asynchronously relative to the sending of free memory page indicators by the guest, in that the source hypervisor may begin the migration of the memory pages without waiting to receive the free memory page indicator from the guest. Thus, the guest may send free memory page indicators and the source hypervisor may migrate memory pages without of these tasks waiting for the other to be performed. This asynchronous sending of free memory page indicators by the guest may avoid migration delays and thus improve the speed of the migration performed by the source hypervisor.

After the guest sends the free memory page indicator, the source hypervisor receives the free memory page indicator from the guest. A free memory page indicator may include any communication from the guest to the source hypervisor that identifies one or more free memory pages. For example, the communication may be sent via shared memory, interrupts, hypercalls, and/or other signaling mechanisms. The guest may send free memory page indicators to the source hypervisor before and/or during the migration of memory pages from the guest memory. For example, the method may include asynchronously providing free memory page indicators from the guest to the source hypervisor while the migration is occurring, without pausing the migration to wait for the free memory page indicators.

The guest may identify the free memory pages in various ways. For example, the guest may traverse guest page tables or read bits from a free bitmap to identify the free memory pages. In some examples, the guest sends the source hypervisor a plurality of free page indicators while memory pages are being read and transmitted over the network to a destination host machine. Accordingly, if one or more memory pages are dirty at a particular point in time, but later become free memory pages, the guest may send the hypervisor one or more free memory page indicators that identify these free memory pages as they are identified by the guest.

At action 208, responsive to receiving one or more free memory page indicators, the source hypervisor places the virtual machine in a suspended state. In some examples, the source hypervisor places the virtual machine in a suspended state such that the guest may not modify the identified free memory pages while the source hypervisor is modifying a migration status (e.g., migration status 316) of the identified one or more free memory pages (as described in action 210, below). In some examples, the virtual machine is placed in the suspended state by stopping the virtual processor of the virtual machine. This may be performed by triggering a virtual machine exit. In some examples, the guest triggers the virtual machine exit via a hypercall or a communication to the hypervisor by memory mapped I/O or port I/O. The virtual machine exit may cause the processor to transition from guest mode to kernel mode, such that instructions of the hypervisor are executed by the processor while not executing the instructions of virtual machine guests.

At action 210, while the virtual machine is in the suspended state, the migration status of the identified one or more free memory pages is modified by the source hypervisor to exclude the identified one or more free memory pages from the migration. In some examples, the migration status of the identified one or more free memory pages is modified in a data structure, such as a bitmap data structure. For example, each memory page may have a bit that is set to indicate that the memory page is to be migrated or cleared to indicate that the memory page is not to be migrated. Accordingly, the source hypervisor may clear a bit in the data structure corresponding to each identified free memory page, such that the hypervisor migrates other memory pages of the virtual machine while skipping migration of the identified one or more free memory pages. In other examples, the identified one or more free memory pages may be added to a list of pages to exclude from the migration. In yet other examples, the identified one or more free memory pages may be excluded from the migration by removing them from a list of pages that are scheduled for migration.

After updating the migration status, the virtual machine may be re-entered to allow processing operations corresponding to the guests of the virtual machine to be resumed. In some examples, the source hypervisor may trigger a virtual machine entry to cause the processor to transition from kernel mode to guest mode, such that instructions of the source hypervisor and the virtual machine guests may be executed.

Once the source hypervisor restores the virtual machine from the suspended state, the source hypervisor may begin migrating the memory pages of the virtual machine to the destination (or continue migrating memory pages, if the migration was already in progress). Accordingly, the source hypervisor may iterate through a migrate list that specifies memory pages to be migrated, and migrate each memory page included on the list. The migration may be performed by reading data from each of the memory pages and writing the data to the destination (whether on the same machine or over a network to another machine). Memory pages may be excluded from the migration if they are removed from the migrate list or if they are included on a migrate blacklist. In other examples, a migration status bitmap may include a bit corresponding to each memory page that indicates whether the memory page is to be migrated or excluded from the migration. Thus, the source hypervisor may read the bits during the migration to select which pages to migrate and which pages to not migrate (e.g., migrate all memory pages having a first bit value while skipping migration of memory pages having a second bit value). Action 210 may be repeated as additional free memory page indicators are received from the guest during the migration. Accordingly, the migration status bitmap may be maintained by the source hypervisor based on the received free memory page indicators.

At action 212, the source hypervisor detects a dirty memory page indicator that identifies one or more dirty memory pages (e.g., dirty memory pages 310). In the present example, the dirty memory page indicator is detected by the source hypervisor to identify one or more dirty memory pages that have been modified while the migration is in progress. These identified one or more dirty pages may include, for example, memory pages previously identified as free memory pages, but that have since been modified. In some examples, the dirty memory page indicator may include any communication from the guest to the source hypervisor that identifies one or more dirty memory pages. For example, the communication may be sent via shared memory, interrupts, hypercalls, and/or other signaling mechanisms. The guest may send dirty memory page indicators to the source hypervisor before and/or during the migration of memory pages from the guest memory of the virtual machine. For example, the method may include asynchronously providing dirty memory page indicators from the guest to the source hypervisor while the migration is occurring, without delaying the migration to wait for the dirty memory page indicators. Accordingly, the source hypervisor may detect dirty page indicators by receiving them from the guest.

In some examples, the source hypervisor may identify dirty memory pages by detecting dirty memory page indicators in other ways. For example, free memory pages may be write protected during initialization of the virtual machine. The modification of the free memory pages may then cause a page fault to occur, which may trigger a processor to generate an exception that provides the hypervisor with the identities of the one or more memory pages whose attempted modification triggered the page fault. Accordingly, the source hypervisor may detect dirty memory page indicators in this way to identify these memory pages as dirty pages and allow the attempted modification to be performed. In some examples, the modification is performed by changing the permissions of the memory pages to allow the guest to perform the modification or by performing the modification by the source hypervisor on behalf of the guest.

At action 214, responsive to detecting the dirty memory page indicator, the source hypervisor modifies a migration status of the one or more dirty memory pages to indicate that the one or more dirty memory pages are to be migrated. The migration status of the identified one or more dirty memory pages may be modified in the same data structure previously modified to exclude the free memory pages from the migration. As discussed above, the data structure may be a bitmap data structure that includes a bit for each memory page that is set to indicate that the memory page is to be migrated or cleared to indicate that the memory page is not to be migrated. Accordingly, the source hypervisor may set a bit in the data structure corresponding to each identified dirty memory page, such that the hypervisor migrates these identified dirty memory pages of the virtual machine while skipping migration of the identified free memory pages. In other examples, the identified one or more dirty memory pages may be added to a list of pages to include in the migration. In yet other examples, the identified one or more dirty memory pages may be included in the migration by removing them from a list of pages that are excluded from the migration. Action 214 may be repeated as additional dirty page indicators are received from the guest during the migration and/or detected by the source hypervisor. Accordingly, the migration status bitmap may be maintained by the hypervisor based on the received dirty memory page indicators.

In the present example, actions 206, 208, 210, 212, and 214 may be repeated based on memory page updates that occur during the migration. For example, memory pages becoming free memory pages during the migration may asynchronously trigger actions 204, 206, 208 and 210. Similarly, memory pages becoming dirty memory pages during the migration may asynchronously trigger action 214.

Figure 4:
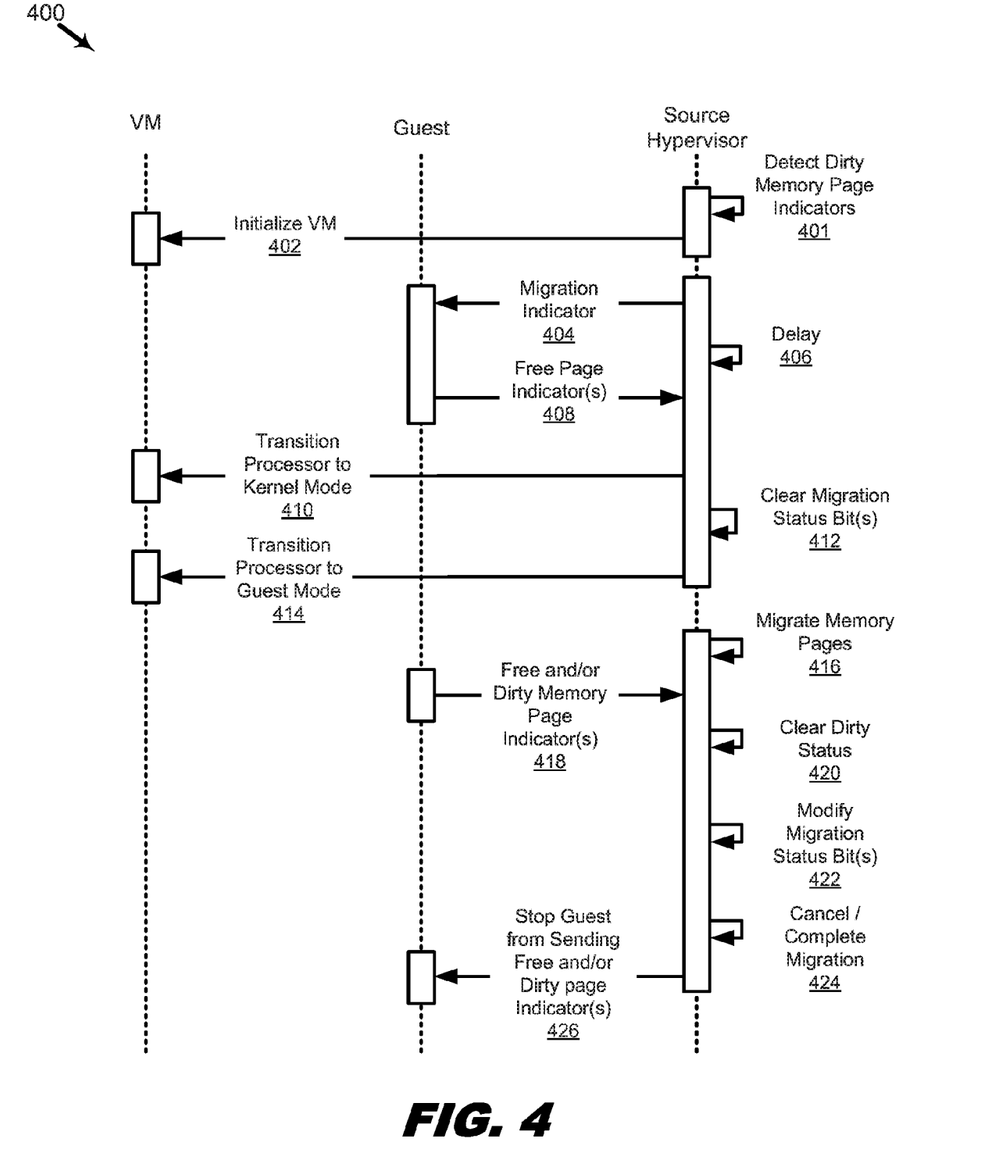
FIG. 4 is a sequence diagram illustrating a sequence of events corresponding to a virtual machine migration, in accordance with various examples of the present disclosure.

FIG. 4 is a sequence diagram illustrating a sequence of events 400 corresponding to a virtual machine migration, in accordance with various examples of the present disclosure.

At event 401, the source hypervisor may begin detecting dirty memory page indicators corresponding to memory that is allocated to the source hypervisor. In some examples, the source hypervisor includes and/or initiates a process that is responsible for detecting dirty memory page indicators. This memory may include memory that is allocated to the source hypervisor, one or more virtual machines, and/or memory assigned to a host on which the source hypervisor runs. The source hypervisor may detect dirty memory page indicators in various ways. For example, memory pages may be initialized as read-only. When write accesses are attempted to be executed corresponding to the memory pages, exceptions may be generated that allows the source hypervisor to detect the attempted write accesses corresponding to the memory pages. The source hypervisor may identify the memory pages that are targeted by the attempted write accesses as dirty memory pages, and allow the write accesses to be processed. Accordingly, in some examples, the dirty memory page indicators include the exceptions triggered by the attempted write accesses to read-only memory pages. In other examples, dirty memory page indicators may be provided as notifications from guests running on one or more virtual machines. The notifications from guests may include one or more data values that identify dirty memory pages, such that the notifications indicate the dirty memory pages.

At event 402, a source hypervisor initializes a virtual machine. The initializing may include booting the virtual machine and allocating resources to the virtual machine. At event 404, responsive to a triggering of a migration, the source hypervisor notifies a guest running on the virtual machine regarding the migration. At event 406, the source hypervisor delays for a preconfigured amount of time to allow the guest time to provide the source hypervisor with one or more indicators that identify free memory pages at event 408. In some examples, the guest provides the source hypervisor with a list of the free memory pages.

At event 410, after receiving the identification of the free memory pages or delaying for the preconfigured amount of time, the source hypervisor transitions the processor from a guest mode to a kernel mode so that processing of instructions by the virtual machine's guests is temporarily suspended. In some examples, the transitioning of the processor is performed by executing a virtual machine (VM) Exit instruction to stop the virtual machine. While operation of the virtual machine's guests is stopped, at event 412 the source hypervisor clears one or more migration status bits corresponding to the identified free memory pages to exclude the free memory pages from the migration. At event 414, after clearing the migration status bits, the source hypervisor transitions the processor from the kernel mode to the guest mode to resume operation of the virtual machine. In some examples, the processor is transitioned to the guest mode by executing a VM Resume instruction.

At event 416, the source hypervisor migrates selected memory pages of the virtual machine. The source hypervisor selects the memory pages for migration that have the migration status bit set. Accordingly, the identified free memory pages are not migrated because their migration status bits have been cleared. However, at event 418, the guest may provide updated statuses of memory pages by sending free memory page and dirty memory page indicators to the source hypervisor to clear the migrate status bits of free memory pages or set the migrate status bits of dirty memory pages.

At event 420, if the source hypervisor detects a dirty page indicator that indicates dirty memory pages, the source hypervisor may clear a dirty status corresponding to the dirty memory pages to resume detecting dirty page indicators. After clearing the dirty status, at event 422 the source hypervisor may then modify the migration status bits of the dirty memory pages by setting the migration status bits based on the detected dirty page indicators. Accordingly, the dirty memory pages identified by the detected dirty page indicators are added to a pool of memory pages scheduled for migration. At event 422, if the guest sent the source hypervisor free memory page indicators, the source hypervisor may modify the migration status bits of the free memory pages by clearing the migration status bits. Accordingly, the free memory pages are removed from the pool of memory pages that are scheduled for migration.

At event 424, the migration of the virtual machine is completed or cancelled. For example, the migration may be completed when all memory pages have been migrated that are in the pool of memory pages scheduled for migration. In another example, the migration of the virtual machine may be cancelled based on a user input or occurrence of a fault. Accordingly, at event 426, the source hypervisor stops the guest from sending free memory page indicators and/or dirty memory page indicators. For example, the source hypervisor may notify the guest that the migration is completed or cancelled, so that the guest is made aware that the free memory page indicators are no longer being processed by the source hypervisor to exclude memory pages from the migration. Accordingly, the guest may stop sending the free memory page indicators to conserve processing resources. Similarly, if the guest was sending the source hypervisor dirty memory page indicators, the guest may also stop sending the source hypervisor such notifications.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of migrating virtual machine memory pages comprising:
   running a guest on a virtual machine that is provided by a source hypervisor;
   sending a migration indicator from the source hypervisor to the guest, the migration indicator corresponding to a migration of the virtual machine from the source hypervisor to a destination hypervisor;
   receiving, by the source hypervisor, a free memory page indicator that is asynchronously sent from the guest to identify one or more free memory pages;
   after receiving the free memory page indicator from the guest, placing the virtual machine in a suspended state;
   while the virtual machine is in the suspended state, modifying a migration status of the identified one or more free memory pages by the source hypervisor to exclude the identified one or more free memory pages from the migration;
   detecting, by the source hypervisor, a dirty memory page indicator that identifies one or more dirty memory pages; and
   modifying, by the source hypervisor, a migration status of the identified one or more dirty memory pages to include the identified one or more dirty pages in the migration.

2. The method of claim 1, wherein the placing of the virtual machine in the suspended state comprises transitioning a processor from a guest mode to a kernel mode.

3. The method of claim 1, further comprising:
   after modifying the migration status of the identified one or more free memory pages, resuming operation of the virtual machine from the suspended state by transitioning a processor from a kernel mode to a guest mode.

4. The method of claim 1, further comprising:
   responsive to detecting the dirty memory page indicator, clearing a dirty status corresponding to the one or more dirty memory pages, wherein the clearing of the dirty status is performed prior to modifying the migration status of the one or more dirty memory pages.

5. The method of claim 1, wherein modifying the migration status of the one or more free memory pages comprises clearing a migrate status bit corresponding to each of the one or more free memory pages in a migration bitmap, and
   wherein modifying the migration status of the one or more dirty memory pages comprises setting the migrate status bit corresponding to each of the one or more free memory pages in the migration bitmap.

6. The method of claim 1, further comprising:
   prior to running the guest on the virtual machine, initiating at least one process to detect dirty memory page indicators corresponding to memory that is allocated to the source hypervisor.

7. The method of claim 1, further comprising:
   after cancelling or completing the migration of the guest, stopping the guest from sending additional free page indicators.

8. The method of claim 1, further comprising:
after sending the migration indicator to the guest, delaying migration of the virtual machine to the destination hypervisor for a preconfigured amount of time.

9. A non-transitory machine-readable medium having stored thereon machine-readable instructions executable to cause a machine to perform operations comprising:
running a guest on a virtual machine that is provided by a source hypervisor;
sending a migration indicator from the source hypervisor to the guest, the migration indicator corresponding to a migration of the virtual machine from the source hypervisor to a destination hypervisor;
receiving, by the source hypervisor, a free memory page indicator from the guest that identifies one or more free memory pages;
after receiving the free memory page indicator from the guest, placing the virtual machine in a suspended state;
while the virtual machine is in the suspended state, modifying a migration status of the identified one or more free memory pages by the source hypervisor to exclude the identified one or more free memory pages from the migration;
detecting, by the source hypervisor, a dirty memory page indicator that identifies one or more dirty memory pages; and
modifying, by the source hypervisor, a migration status of the identified one or more dirty memory pages to include the identified one or more dirty pages in the migration.

10. The non-transitory machine-readable medium of claim 9, the operations further comprising:
after modifying the migration status of the identified one or more free memory pages, resuming operation of the virtual machine from the suspended state.

11. The non-transitory machine-readable medium of claim 9, the operations further comprising:
responsive to detecting the dirty memory page indicator, clearing a dirty status corresponding to the one or more dirty memory pages, wherein the clearing of the dirty status is performed prior to modifying the migration status of the one or more dirty memory pages.

12. The non-transitory machine-readable medium of claim 9, wherein modifying the migration status of the one or more free memory pages comprises clearing a migrate status bit corresponding to each of the one or more free memory pages in a migration bitmap, and
wherein modifying the migration status of the one or more dirty memory pages comprises setting the migrate status bit corresponding to each of the one or more free memory pages in the migration bitmap.

13. The non-transitory machine-readable medium of claim 9, the operations further comprising:
sending, by the guest, the source hypervisor a plurality of free page indicators during the migration; and
after cancelling or completing the migration of the guest, stopping the guest from sending free page indicators.

14. The non-transitory machine-readable medium of claim 9, the operations further comprising:
after sending the migration indicator to the guest, delaying migration of the virtual machine for a preconfigured amount of time.

15. A system comprising:
one or more hardware processors coupled to a memory that read instructions from the memory to cause the system to perform operations comprising:
running a guest on a virtual machine that is provided by a source hypervisor;
sending a migration indicator from the source hypervisor to the guest, the migration indicator corresponding to a migration of the virtual machine;
receiving, by the source hypervisor, a free memory page indicator from the guest that identifies one or more free memory pages;
after receiving the free memory page indicator from the guest, placing the virtual machine in a suspended state;
while the virtual machine is in the suspended state, modifying a migration status of the identified one or more free memory pages by the source hypervisor to exclude the identified one or more free memory pages from the migration;
detecting, by the source hypervisor, a dirty memory page indicator that identifies one or more dirty memory pages; and
modifying, by the source hypervisor, a migration status of the identified one or more dirty memory pages to include the identified one or more dirty pages in the migration.

16. The system of claim 15, the operations further comprising:
after modifying the migration status of the identified one or more free memory pages, resuming operation of the virtual machine from the suspended state.

17. The system of claim 15, the operations further comprising:
responsive to detecting the dirty memory page indicator, clearing a dirty status corresponding to the one or more dirty memory pages, wherein the clearing of the dirty status is performed prior to modifying the migration status of the one or more dirty memory pages.

18. The system of claim 15, wherein modifying the migration status of the one or more free memory pages comprises clearing a migrate status bit corresponding to each of the one or more free memory pages in a migration bitmap, and
wherein modifying the migration status of the one or more dirty memory pages comprises setting the migrate status bit corresponding to each of the one or more free memory pages in the migration bitmap.

19. The system of claim 15, the operations further comprising:
sending, by the guest, the source hypervisor a plurality of free page indicators during the migration; and
after cancelling or completing the migration of the guest, stopping the guest from sending free page indicators.

20. The system of claim 15, the operations further comprising:
after sending the migration indicator to the guest, delaying migration of the virtual machine for a preconfigured amount of time.

* * * * *